United States Patent
Agarwal et al.

(10) Patent No.: US 9,602,377 B2
(45) Date of Patent: Mar. 21, 2017

(54) NETWORK LATENCY ESTIMATION FOR MOBILE DEVICES

(71) Applicant: Microsoft Corporation, Redmond, WA (US)

(72) Inventors: Sharad Agarwal, Seattle, WA (US); Jyh-Han Lin, Mercer Island, WA (US); Weili Liu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 397 days.

(21) Appl. No.: 14/055,480

(22) Filed: Oct. 16, 2013

(65) Prior Publication Data

US 2014/0040467 A1 Feb. 6, 2014

Related U.S. Application Data (63) Continuation of application No. 12/951,781, filed on Nov. 22, 2010, now Pat. No. 8,566,441.

(51) Int. Cl.
*G06F 15/173* (2006.01)
*H04L 12/26* (2006.01)

(52) U.S. Cl.
CPC .......... *H04L 43/0852* (2013.01); *H04L 43/04* (2013.01); *H04L 43/0864* (2013.01)

(58) Field of Classification Search
CPC . H04L 43/0852; H04L 43/16; H04L 43/0864; H04L 43/106; H04L 43/04; H04L 43/062; H04L 43/08

(Continued)

(56) References Cited

U.S. PATENT DOCUMENTS 6,449,722 B1 * 9/2002 West ............... H04L 45/22
                                                    455/422.1
7,437,450 B1 * 10/2008 Gore ............... H04L 41/5009
                                                    702/186

(Continued)

OTHER PUBLICATIONS

Nicholson, et al., "BreadCrumbs: Forecasting Mobile Connectivity", Retrieved at http://citeseerx.ist.psu.edu/viewdoc/download-?doi=10.1.1.122.7261&rep=rep1&type=pdf>>, Annual International Conference on Mobile Computing and Networking, Sep. 14-19, 2008, pp. 1-14.

(Continued)

*Primary Examiner* — Nam Tran
(74) *Attorney, Agent, or Firm* — Judy Yee; Micky Minhas (57) ABSTRACT

Embodiments calculate an estimated latency between computing devices. A latency service aggregates latency records defining latency measurements and corresponding latency factors from a plurality of computing devices. From the aggregated latency records, the latency service defines relationships between the latency measurements and the corresponding latency factors. Responsive to a request for an estimated latency from a mobile computing device, the latency service applies the defined relationships to estimate the latency based on the latency factors associated with the received request. In some embodiments, the estimated latency includes three portions: a first latency value representing the latency from the mobile computing device to a cell site, a second latency value representing the latency from the cell site to an access point, and a third latency value representing the latency from the access point to a destination computing device.

20 Claims, 6 Drawing Sheets

(58) Field of Classification Search
USPC .................................... 709/218, 223, 224
See application file for complete search history.

(56) References Cited

U.S. PATENT DOCUMENTS

| | | | |
|---|---|---|---|
| 7,477,602 B2 | 1/2009 | Ling et al. | |
| 7,489,635 B2 | 2/2009 | Evans et al. | |
| 7,680,038 B1* | 3/2010 | Gourlay | H04L 43/0852 370/230 |
| 7,710,905 B2 | 5/2010 | Dyck et al. | |
| 8,144,611 B2 | 3/2012 | Agarwal et al. | |
| 2002/0101880 A1 | 8/2002 | Kim | |
| 2003/0144006 A1 | 7/2003 | Johansson et al. | |
| 2004/0185786 A1 | 9/2004 | Mirbaha et al. | |
| 2005/0091378 A1 | 4/2005 | Nonnenmacher | |
| 2005/0227689 A1 | 10/2005 | Jewett | |
| 2009/0154367 A1* | 6/2009 | Aaron | H04L 67/32 370/252 |
| 2010/0204914 A1 | 8/2010 | Gad et al. | |
| 2012/0063315 A1* | 3/2012 | Likar | H04L 47/14 370/235 |
| 2012/0131129 A1 | 5/2012 | Agarwal et al. | |

OTHER PUBLICATIONS

Wittie, et al., "MIST: Cellular Data Network Measurement for Mobile Applications", Retrieved at http://www.cs.ucsb.edu/~ebelding/txt/broadnets07_mist.pdf>>, Fourth International Conference on Broadband Communications, Networks and Systems, Broadnets, Sep. 10-14, 2007, pp. 1-9.

Non-Final Office Action in U.S. Appl. No. 12/951,781, Mailed Date: Nov. 9, 2012, 25 pages.

Notice of Allowance in U.S. Appl. No. 12/951,781, Mailed Date: Jun. 20, 2013, 14 pages.

Examiner-Initiated Interview Summary in U.S. Appl. No. 12/951,781, Mailed Date: Jun. 20, 2013, 1 page.

"First Office Action and Search Report Received in China Patent Application No. 201110411484.5", Mailed Date: Jan. 6, 2014, 11 pages.

"Second Office Action Received in China Patent Application No. 201110411484.5", Mailed Date: Sep. 19, 2014, 7 pages.

* cited by examiner

NETWORK LATENCY ESTIMATION FOR MOBILE DEVICES

This application is a continuation of commonly-owned, co-pending U.S. patent application Ser. No. 12/951,781 filed Nov. 22, 2010, the entire disclosure of which is hereby incorporated by reference herein for all purposes.

BACKGROUND

Computing devices may be connected to each other via various network elements. The computing devices experience latencies that are dependent on the specific network elements included in the connection. The experienced latencies can directly affect the user experience on the computing devices. Some existing systems measure the latencies for computing devices in fixed locations, such as a personal computer connected to the Internet. Such measurements are specific to each of the computing devices, and typically have high time and data traffic costs.

Other systems use geo-location databases to convert the Internet Protocol (IP) addresses of each computing device to latitude-longitude values to estimate latency between the computing devices based on geographic distance. Such systems are typically fast but inaccurate at least because latitude-longitude values for many IP addresses are missing or misplaced. Additionally, the correlation between geographic distance and latency is poor with the existing systems. Further, for mobile devices, there is often no correlation between IP addresses and latitude-longitude values. Even for mobile devices that have a correlation between IP address and latitude-longitude values, the geographic locations of mobile devices do not correlate well to latency (e.g., due to the effect of factors such as congestion and signaling).

SUMMARY

Embodiments of the disclosure receive a request for a latency estimation for sending data from a first computing device to a second computing device. The request identifies latency factors of the first computing device including at least a cell site identifier, a signal strength, an access proxy, and the destination computing device. The latency factors and latency measurements aggregated from a plurality of computing devices are accessed. Relationships between the accessed latency factors and the accessed latency measurements are defined. The latency estimation is calculated based on the defined relationships and the latency factors of the first computing device. The calculated latency estimation includes a sum of a first latency value from the first computing device to a cell site identified by the cell site identifier, a second latency value from the cell site to an access point identified by the access proxy, and a third latency value from the access point to the second computing device. The calculated latency estimation is provided to the first computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure enable network latency estimation for communication between computing devices. In some embodiments, latency is estimated for communication between a mobile computing device 306 and a destination computing device 104. In such embodiments, the latency estimation includes three portions: a first latency value corresponding to a latency between the mobile computing device 306 and a cell site (e.g., a cellular tower), a second latency value corresponding to a latency between the cell site and an access point, and a third latency value corresponding to a latency between the access point and the destination computing device 104.

Estimating the latency enables applications executing on mobile computing devices 306 to adjust operations to maintain or enhance the user experience on the mobile computing devices 306. The user experience for some applications, such as video streaming applications or web browsers, is heavily dependent on network latency. The network latency is dependent on connections that, for mobile computing devices 306, are dynamic and may change frequently. Aspects of the disclosure enable applications to select a particular network connection or server that is estimated to provide the least latency. Aspects of the disclosure also enable mobile computing devices 306 to determine when to communicate with other computing devices. For example, a high estimated latency may indicate to an application that communication should not even be attempted (e.g., during voice-over-IP or video conferencing connection attempts, or when selecting players in an multiplayer online game).

Referring again to FIG. 1, an exemplary block diagram illustrates a plurality of computing devices 102 communicating with one or more destination computing devices 104 and a latency service 118. The computing devices 102 include computing device #1 through computing device #M. The computing device 102, however, represents any device executing instructions (e.g., as application programs, operating system functionality, or both) to implement the operations and functionality associated with the computing device 102. The computing device 102 may include a mobile computing device such as mobile computing device 306 or any other portable device. In some embodiments, the mobile computing device 306 includes a mobile telephone, laptop, netbook, gaming device, and/or portable media player. The computing device 102 may also include less portable devices such as desktop personal computers, kiosks, and tabletop devices. Additionally, the computing device 102 may represent a group of processing units or other computing devices.

The computing device 102 has at least one processor 106 and a memory area 108. The processor 106 includes any quantity of processing units, and is programmed to execute computer-executable instructions for implementing aspects of the disclosure. The instructions may be performed by the processor 106 or by multiple processors executing within the computing device 102, or performed by a processor external to the computing device 102. In some embodiments, the processor 106 is programmed to execute instructions such as those illustrated in the figures (e.g., FIG. 2).

Figure 1:
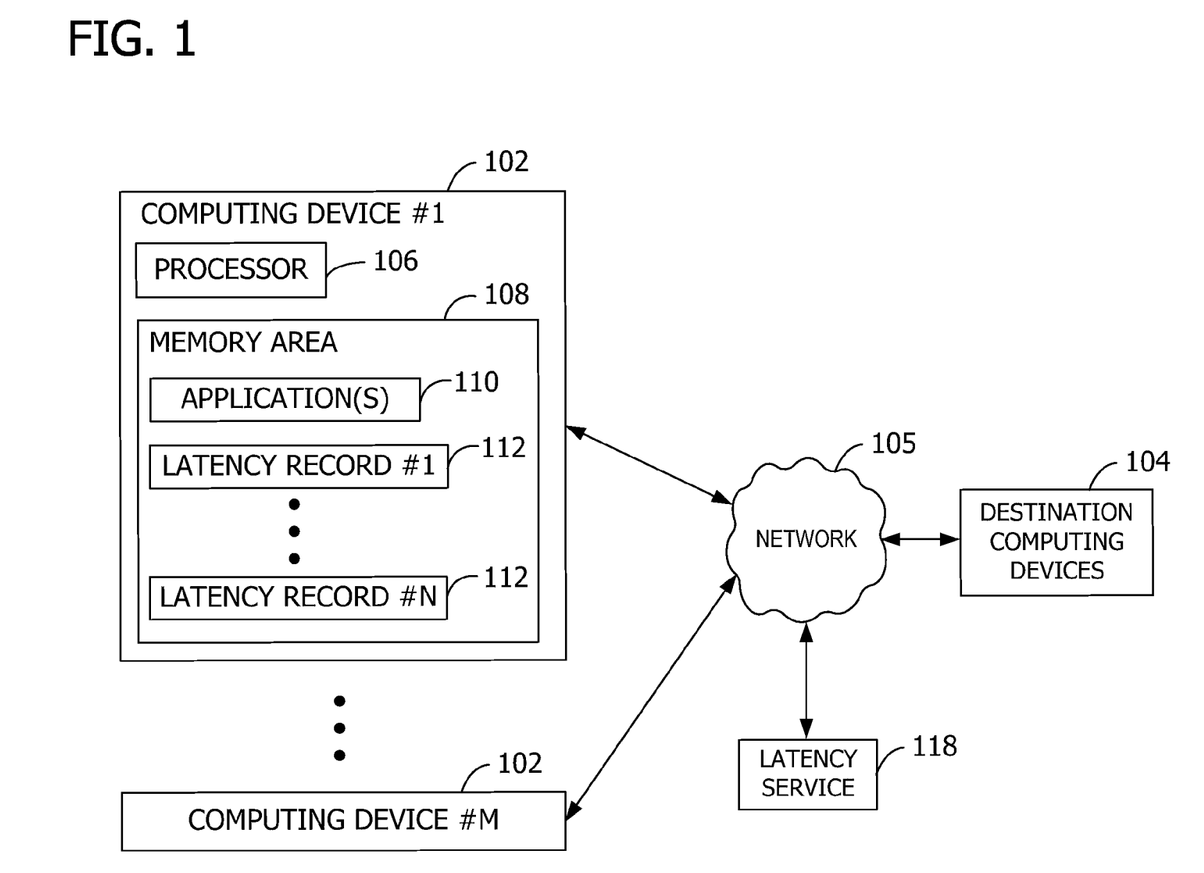
FIG. 1 is an exemplary block diagram illustrating a plurality of computing device communicating with destination computing devices and a latency service.

The computing device 102 further has one or more computer-readable media such as the memory area 108. The memory area 108 includes any quantity of media associated with or accessible by the computing device 102. The memory area 108 may be internal to the computing device 102 (as shown in FIG. 1), external to the computing device 102 (not shown), or both (not shown).

The memory area 108 stores, among other data, one or more applications 110. The applications 110, when executed by the processor 106, operate to perform functionality on the computing device 102. Exemplary applications 110 include mail application programs, web browsers, calendar application programs, address book application programs, messaging programs, media applications, location-based services, search programs, and the like. The applications 110 may communicate with counterpart applications or services such as web services accessible via a network such as network 105. For example, the applications 110 may represent downloaded client-side applications that correspond to server-side services executing in a cloud.

When executed, one or more of the applications 110 may communicate with other devices such as the destination computing devices 104. Latency may occur during the communications. The memory area 108 further stores one or more latency records 112, such as latency record #1 through latency record #N. Each of the latency records 112 has one or more latency factors. In some embodiments, the latency factors identify one or more of the following: a latency measurement, a cell site identifier, a location of the computing device 102, a signal strength, an access point name 612 (APN), and one of the destination computing devices 104. The latency measurement corresponds to a latency experienced by the computing device 102 when sending data from the computing device 102 to one of the destination computing devices 104 via network 105. The cell site identifier identifies a cell site to which the computing device 102 is connected during the latency measurement. The cell site represents a network element connecting the computing device 102 to other network elements. The cell site may include, for example, a cellular tower, a base station, a base transceiver station, a base station site, or any other network element supporting any quantity and type of communication modes. Aspects of the disclosure are operable with any cell site supporting any quantity and type of wireless and/or wired communication modes including cellular divisional multiple access (CDMA), Global System for Mobile Communications (GSM), and the like.

The signal strength, signal-to-noise ratio, error rate, and/or stability of the connection represents the strength of the connection between the computing device 102 and the cell site. The APN 612 identifies a particular network 105 used by the computing device 102 during the latency measurement. The network 105 includes any wired and/or wireless network, and may further support client-server and peer-to-peer communications. The destination computing devices 104 include any computing devices configured to communicate with the computing devices 102.

Exemplary latency records 112 may include the latency factors or parameters shown in Table 1. In some embodiments, the latency record 112 is represented as $\mathbb{R}_{p_i, t_j}$.

TABLE 1

Exemplary Latency Factors Associated with a Latency Record.

| | |
|---|---|
| $p_i$ | Mobile computing device identifier (e.g. a telephone number, international mobile equipment identity, or a random but static global user identifier) |
| $t_j$ | Timestamp (e.g. coordinated universal time) |
| location($\mathbb{R}_{p_i, t_j}$) | Location of the mobile computing device (e.g. as planetary coordinates such as latitude and longitude or a signature of a location such as a set of cellular towers and signal strengths) |
| destination($\mathbb{R}_{p_i, t_j}$) | IP address of the destination computing device. Alternatively, a mobile computing device identifier of the destination may be used. |
| latency($\mathbb{R}_{p_i, t_j}$) | Observed latency (in milliseconds) (e.g. single latency measurement, or minimum latency of successive measurements) |
| operator($\mathbb{R}_{p_i, t_j}$) | Mobile operator network connected to |
| tower($\mathbb{R}_{p_i, t_j}$) | Cell site connected to (e.g., cellular tower, wireless fidelity basic service set identifier, or universal serial bus connection) |
| APN($\mathbb{R}_{p_i, t_j}$) | APN being used in the case of cellular connection |
| RSSI($\mathbb{R}_{p_i, t_j}$) | Observed signal strength (e.g., for the cell site or wireless fidelity basic service set identifier |

While the parameters above constitute the latency records 112 in some embodiments, latency records 112 having additional or fewer latency factors are contemplated. For example, in other embodiments, the set of latency factors identifies a cell site identifier, a signal strength, an access proxy (e.g., APN 612), and one of the destination computing devices 104. Those skilled in the art, however, will note that any one of the latency factors can be used to estimate latency. In such embodiments, however, the accuracy of the latency estimation is affected by the quantity of latency factors involved in the estimation. For example, signal strength has a small effect on latency except when the signal strength is very low. In contrast, the cell site identifier has a significant effect on latency. In some embodiments, the cell site identifier has two portions: one portion identifies the cell tower and the other portion (e.g., the location area code) identifies the radio network controller. Knowing either portion of the cell site identifier can aid in estimating latency. In another example, if only the access proxy is known, the accuracy of the latency estimation is low (e.g., off by as much as 100 ms or more). In another example, knowing the destination may have little effect on the latency as the majority of the latency may be on the side of the mobile computing device 306, in some embodiments.

The computing devices 102 provide the latency records 112 to the latency service 118. The latency records 112 may be provided upon creation of each of the latency records 112 or periodically (e.g., batched nightly, or sent after a predefined quantity of the latency records 112 have been created, etc.). Creating and providing the records are described next with reference to FIG. 2.

Figure 2:
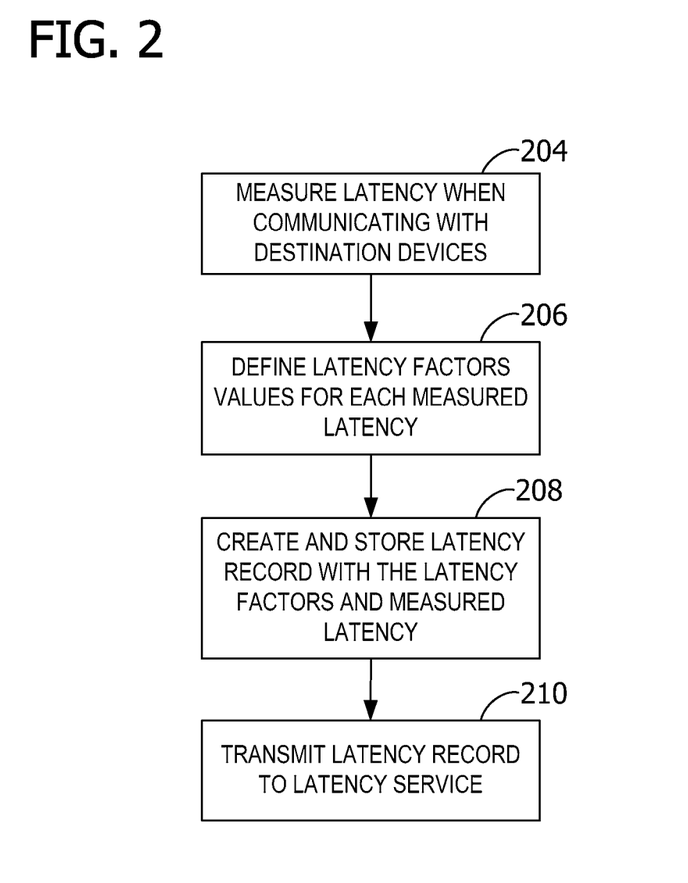
FIG. 2 is an exemplary flow chart illustrating operation of the computing device to create latency records and provide the latency records to the latency service.

Referring next to FIG. 2, an exemplary flow chart illustrates operation of the computing device 102 to create latency records 112 and provide the latency records 112 to the latency service 118. At 204, one of the computing devices 102 measures a latency of data transmitted from the computing device 102 to one of the destination computing devices 104. For example, one or more of the applications 110 executed by the computing device 102 each performs latency measurements. In another example, an operating system associated with the computing device 102 performs the latency measurement. The computing device 102 may measure the latency while connected to other computing devices by, for example, performing operations to periodically send and receive test packets during the connection. The test packets may be piggy-backed on other data packets being sent during the connection, or may be dedicated test packets to particular destination computing devices 104 such as landmark servers scattered across the network (e.g., if the data traffic volume during the connection is low).

At 206, for each measured latency, the computing device 102 defines values for each of the latency factors. In some embodiments, the latency factors represent at least the measured latency, a cell site identifier, a location of the computing device 102, a signal strength, an APN 612, and one of the destination computing devices 104. The set of values for the latency factors corresponds to the measured latency, and generally describes the conditions, context, and/or environment in which the latency was measured. At 208, the latency record 112 is created with the defined set of latency factor values. The latency record 112 is stored, for example, in the memory area 108 of the computing device 102.

At 210, the latency record 112 stored in the memory area 108 is sent to the latency service 118. In some embodiments, the computing device 102 sends each latency record 112 upon creation. In other embodiments, the computing device 102 sends available latency records 112 periodically. For example, the computing device 102 may accumulate a threshold quantity of the latency records 112 before transmitting the latency records 112. In another example, the computing device 102 may transmit the created latency records 112 periodically such as nightly, weekly, etc.

Figure 3:
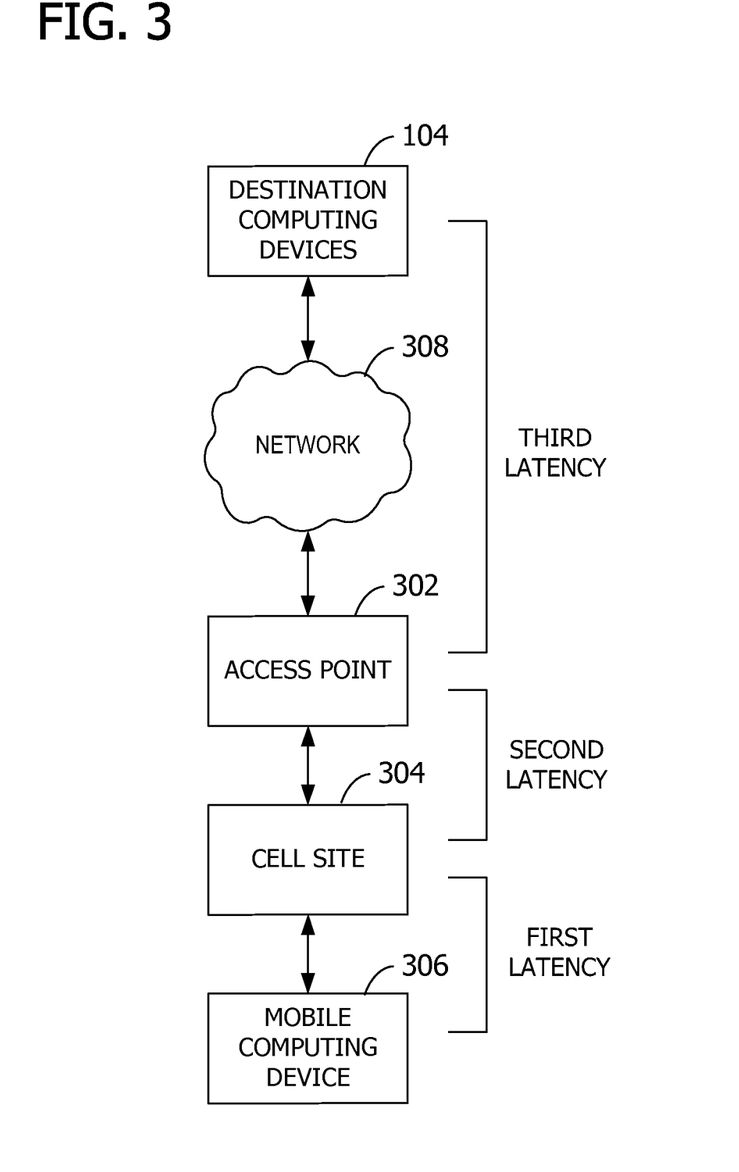
FIG. 3 is an exemplary block diagram illustrating latencies in communication between a mobile computing device and destination computing devices.

Referring next to FIG. 3, an exemplary block diagram illustrates latencies in communication between the mobile computing device 306 and destination computing devices 104. The communication may take the form of packet communication, data streaming, and/or any other form of communication between the mobile computing device 306 and the destination computing devices 104. Each connection between the mobile computing device 306 and one of the destination computing devices 104 includes at least a cell site 304 and an access point 302. The latency experienced between the mobile computing device 306 and the destination computing device 104 is dependent on the cell site 304 and access point 302 associated with the connection. The mobile computing device 306 communicates with the cell site 304. The cell site 304 may include, for example, a cellular tower, a base station, a base transceiver station, a base station site, or any other network element supporting any quantity and type of communication modes. The cell site 304 communicates with a network 308 such as the Internet via the access point 302. The access point 302 identifies the connection to the network 308.

Communication from the mobile computing device 306 to the destination computing device 104 experiences latency that may be divided into three portions. While the latency is described in the embodiment of FIG. 3 as being divided into three portions, other embodiments contemplate additional or fewer portions. For example, one or more of the portions illustrated in FIG. 3 may be subdivided into additional portions, or the portions illustrated in FIG. 3 may be combined.

In the example of FIG. 3, a first latency occurs between the mobile computing device 306 and the cell site 304. The first latency may be dependent at least on signal strength experienced by the mobile computing device 306 and congestion of the cell site 304 (e.g., based on the quantity of devices connected to the cell site 304). Additionally, the first latency is dependent on the particular cell site 304 as each cell site 304 may cover different region sizes, have different transmit power, and/or different loss characteristics.

A second latency occurs between the cell site 304 and an access point 302. The second latency may be dependent at least on a mobile operator network 602 associated with the access point 302, and congestion of the mobile operator network 602. In some embodiments, the second latency is common to mobile computing devices 306 connected to the cell site 304 and using the same access point 302. A third latency occurs between the access point 302 identified by the access point 302 and the destination computing device 104.

Using the exemplary latency factors from Table 1, the first latency, second latency, and third latency may be expressed in the following Equation 1 below, where p corresponds to "phone," t corresponds to "tower," b corresponds to "backhaul," and d corresponds to "destination."

$$\text{latency}(\mathbb{R}_{p_i,t_j}) = \text{latency}_{p-t}(RSSI(\mathbb{R}_{p_i,t_j}), \text{tower}(\mathbb{R}_{p_i,t_j}),$$
$$\text{congestion}_t(\text{tower}(\mathbb{R}_{p_i,t_j}), t_j)) + \text{latency}_{t-APN}(APN(\mathbb{R}_{p_i,t_j}),$$
$$\text{tower}(\mathbb{R}_{p_i,t_j}), \text{congestion}_b(\text{tower}(\mathbb{R}_{p_i,t_j}), APN(\mathbb{R}_{p_i,t_j}), t_j)) +$$
$$\text{latency}_{APN-d}(APN(\mathbb{R}_{p_i,t_j}), \text{destination}(\mathbb{R}_{p_i,t_j}), t_j)$$

(1)

In some embodiments, values for each of the first latency, second latency, and third latency are calculated as next described with reference to FIG. 4.

Figure 4:
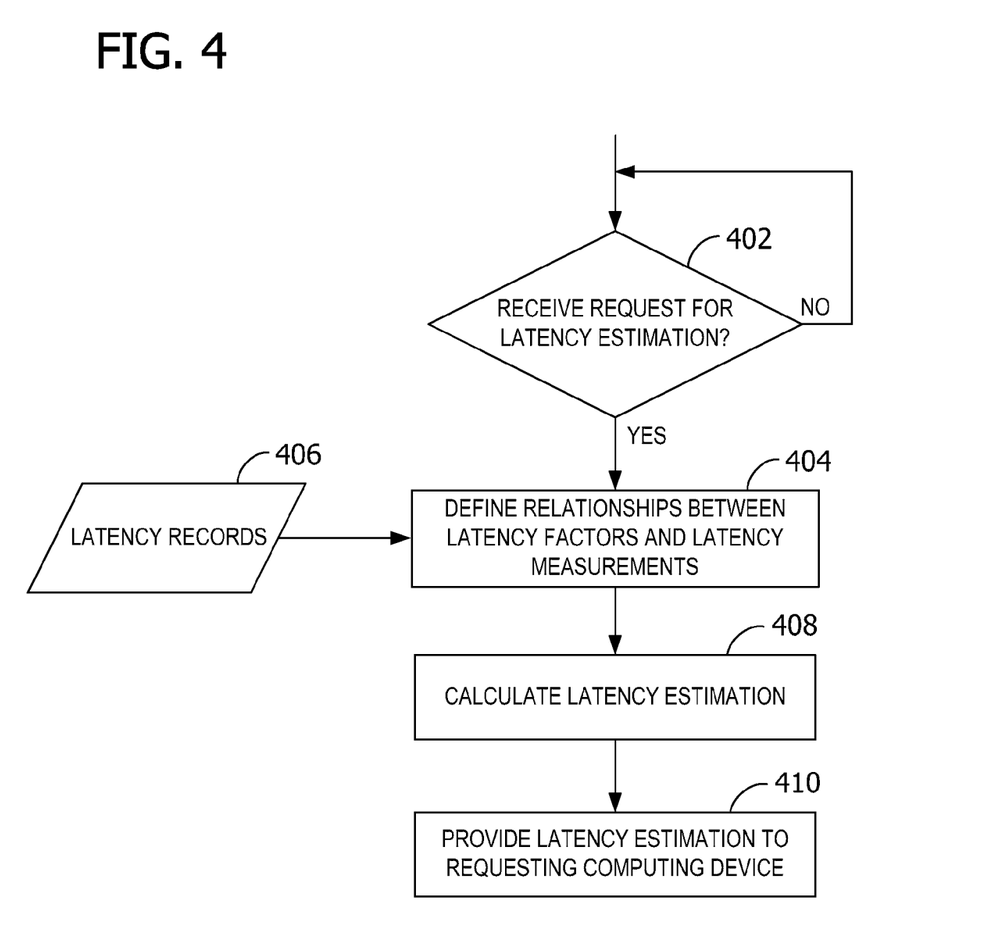
FIG. 4 is an exemplary flow chart illustrating operation of the latency service to calculate latency estimations based on input latency factors.

Referring next to FIG. 4, an exemplary flow chart illustrates operation of the latency service 118 to calculate latency estimations based on input latency factors. The latency service 118 represents any computing device programmed to perform the operations illustrated in FIG. 4. For example, the latency service 118 may represent a web service, network operations center, cloud computing service, server computing device, or other functionality external to the computing device 102. In additional examples, the latency service 118 may execute on the mobile computing device 306, a computing device associated with a mobile operator, a vendor computing device, and/or one of the destination computing devices 104 (e.g., a game program attempting to evaluate connections to the computing devices 102). The latency service 118 may include an application programming interface (API) allowing computing devices 102 to query for latency estimations.

In some embodiments, each of the operations illustrated in FIG. 4 are performed by the latency service 118. In other embodiments, one or more of the operations are performed by other computing devices such as the computing device 102 or the mobile computing device 306.

As illustrated in FIG. 1, the latency service 118 aggregates the latency records 112 from the plurality of the computing devices 102. The latency service 118 may receive a request for a latency estimation from one or more of the computing devices 102 (e.g., from applications 110 or operating systems executing on the computing devices 102). The request identifies one or more of the latency factors. For example, the request identifies a cell site identifier, a signal strength, an APN 612, and one of the destination computing devices 104. The request may be received, for example, via an application programming interface. If the request for a latency estimation for sending data from a first computing device to a second computing device is received at 402, the latency service 118 analyzes aggregated latency records 504 at 406 to define relationships between the latency measurements and the corresponding latency factors. In some embodiments, the latency service 118 defines a relationship between the signal strength and the corresponding latency measurements for each cell site. A low signal strength, for example, may correspond to an increased latency. In further embodiments, the latency service 118 determines congestion (e.g., utilization) associated with each cell site by analyzing a quantity of computing devices such as computing devices 102 currently connected to each cell site. A high number of devices connected to a cell site may correspond, for example, to an increased latency.

The relationships between the signal strength and latency, as well as between the congestion and latency, may be represented as histograms. Further, the relationships may be defined off-line, in a batch processing mode, or by a separate service.

Based on the exemplary latency factors illustrated in Table 1, the congestion for each cell site may be calculated as shown in Equation (2) below.

$$congestion_{tower}(tower, t) = \sum_i \mathbb{R}_{p_i,t} \quad (2)$$

where $tower(\mathbb{R}_{p_i,t}) = tower$

Based on the exemplary latency factors illustrated in Table 1, the congestion for each APN 612 may be expressed as shown in Equation (3) below.

$$congestion_{backhaul}(tower, APN, t) = \sum_i \mathbb{R}_{p_i}, t \quad (3)$$

where $tower(\mathbb{R}_{p_i,t}) = tower$ and $APN(\mathbb{R}_{p_i,t}) = APN$

In some embodiments, the latency service 118 analyzes the aggregated latency records 504 to maintain an estimation of the latency between each computing device 102 and cell site to which the computing device 102 is connected, an estimation of the congestion at each cell site (e.g., based on the quantity of connected computing devices), an estimation of the latency between each cell site and APN 612, and an estimation of the congestion associated with each APN 612.

Based on the defined relationships, the latency service 118 calculates at 408 a latency estimation for the latency factors associated with the first computing device provided in the received request. The latency service 118 applies the defined relationships to the latency factors in the request from the first computing device. In some embodiments, the latency service 118 may filter the aggregated latency records 504 based on cell site identifier or APN 612, and calculate the latency estimation based on the filtered latency records.

In some embodiments, the calculated latency estimation includes a single value, a histogram of values, a cumulative distribution function, or the like that represents the estimated latency based on the aggregated latency records 504. In other embodiments, the calculated latency estimation includes a combination of latency values corresponding to the first latency, second latency, and third latency illustrated in FIG. 3. A first latency value represents the first latency from the first computing device to the cell site identified by the cell site identifier in the request. The second latency value represents the second latency from the cell site to the access point identified by the APN 612 in the request. The third latency value represents the third latency from the access point to the second computing device.

At 410, the latency service 118 provides the calculated latency estimation to the first computing device. The first computing device may adjust performance of operations of execution of the applications executing on the first computing device based on the calculated latency estimation. For example, some operations may be postponed, or execution of some applications may be suspended, if the latency estimation exceeds a pre-defined threshold.

Alternatively or in addition, the operations illustrated in FIG. 4 may be executed periodically for identified (e.g., subscribed) computing devices absent an explicit request. In such embodiments, the identified computing devices keep the latency service 118 informed of current latency factors (e.g., location, cell site, etc.). The latency service 118 calculates and provides the latency estimations periodically (e.g., every five minutes). The calculated latency estimations are cached by the identified computing devices for use by applications executing on the identified computing devices.

The latency service 118 may also provide additional information or recommendations to the first computing device along with the calculated latency estimation. For example, the latency service 118 may receive data indicating movement of the first computing device. The data may include accelerometer data, location information (e.g., global positioning system data), and/or other data indicating a current movement of the first computing device. Based on the received data and knowledge of locations of cell sites, the latency service 118 may compute a time value (e.g., absolute or relative) during which the calculated latency estimation will remain valid. For example, the latency service 118 may determine that the first computing device will change cell sites in three minutes, after which the latency estimation will change because of the different cell site. In a further embodiment, the latency estimation determines that the different cell site will increase or decrease the latency estimation, and provides that expected adjustment to the first computing device. The first computing device is then able to intelligently adjust execution of applications based on the current latency estimation and the expected adjustment. For example, the first computing device may decide to stay connected to the cell site until the latency is expected to decrease, or may decide to switch to another cell site immediately. In another example, the user is warned of the impending degradation of performance.

In further embodiments, the latency service 118 calculates an accuracy value, confidence factor, or other measurement of accuracy associated with the latency estimation.

The latency service 118 may further provide recommendations to the first computing device based on the latency estimation. For example, the latency service 118 may select one or more alternative cell sites based on the relationships defined at 404 and the calculated latency estimation. In such an example, the latency service 118 may filter the defined relationships to identify first latency values associated with cell sites near the cell site to which the first computing device is currently connected (e.g., determined from the cell site identifier in the request). The latency service 118 selects the nearby cell sites having first latency values lower than the first latency value calculated as part of the latency estimation at 408. The selected nearby cell sites are recommended to the first computing device as the alternative cell sites. Alternatively or in addition, the latency service 118 may recommend one or more physical locations for the first computing device to move to, where the first computing device automatically switches to at least one of the selected nearby cell sites upon arriving at the physical locations.

In further embodiments, the latency service 118 selects one or more wireless fidelity (Wi-Fi) access locations (or other connection modalities such as BLUETOOTH brand communication systems) based on the location of the first computing device as identified in the request. The latency service 118 selects the wireless fidelity access locations having latencies less than the calculated latency estimation. The latency service 118 then recommends the selected wireless fidelity access locations to the first computing device as alternative connections to yield a latency that is less than the calculated latency estimation. In embodiments where the destination computing device 104 is associated with a multiplayer online game, the latency service 118 may recommend network access locations at which other players of the multiplayer online game are connected and/or provide a heat map indicating the same.

Figure 5:
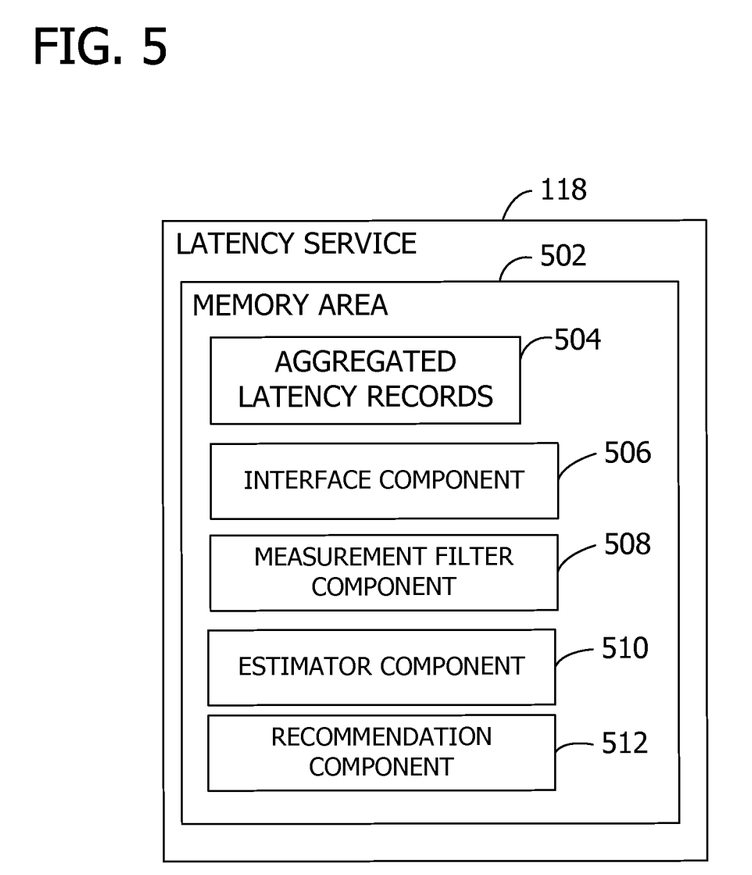
FIG. 5 is an exemplary block diagram illustrating a latency service storing computer-executable components for calculating and providing latency estimations.

Referring next to FIG. 5, an exemplary block diagram illustrates the latency service 118 storing computer-executable components for calculating and providing latency estimations. The latency service 118 includes, or has access to, one or more computer-readable media such as a memory area 502. The memory area 502 stores the aggregated latency records 504 (e.g., aggregated from the plurality of computing devices 102). The memory area 502 also stores one or more computer-executable components. Exemplary components include an interface component 506, a measurement filter component 508, an estimator component 510, and a recommendation component 512. The interface component 506, when executed by at least one processor of the latency service 118, causes the processor to receive a request for a latency estimation for sending data from a first computing device to a second computing device. In some embodiments, the interface component 506 includes a network interface card and/or computer-executable instructions (e.g., a driver) for operating the network interface card. Alternatively or in addition, the interface component 506 includes a graphics card for displaying data to the user and receiving data from the user. The interface component 506 may also include computer-executable instructions (e.g., a driver) for operating the graphics card. Further, the interface component 506 may include a display (e.g., a touch screen display) and/or computer-executable instructions (e.g., a driver) for operating the display. The interface component 506 may also include one or more of the following to provide data to the user or receive data from the user: speakers, a sound card, a camera, a microphone, a vibration motor, and one or more accelerometers. For example, the user may input commands or manipulate data by moving the computing device 102 in a particular way.

The measurement filter component 508, when executed by the processor of the latency service 118, causes the processor to access relationships derived from the latency factors and latency measurements aggregated from a plurality of computing devices 102. The estimator component 510, when executed by the processor of the latency service 118, causes the processor to calculate the latency estimation based on the relationships accessed by the measurement filter and the latency factors of the first computing device received by the interface component 506. The calculated latency estimation may include a sum of a first latency value from the first computing device to a cell site identified by the cell site identifier, a second latency value from the cell site to an access point identified by the APN 612, and a third latency value from the access point to the second computing device. The interface component 506 further executes to provide the calculated latency estimation to the first computing device.

In some embodiments, the estimator component 510 calculates the second latency value by determining a latency from the first computing device to the access point identified by the APN 612 from the request received by the interface component 506. For example, the first computing device pings the access point to determine this latency (e.g., performs trace routes using Internet Control Message Protocol packets). Using the exemplary latency factors from Table 1, the latency between the first computing device and the APN 612 may be expressed as shown in Equation (4) below.

$$\text{latency}_{phone-APN}(RSSI,\text{tower},APN)=\text{histogram}_{i,j}(\text{latency}(\mathbb{R}_{p_i,t_j}))$$

$$\text{where } RSSI(\mathbb{R}_{p_i,t_j})=RSSI, \text{tower}(\mathbb{R}_{p_i,t_j})=\text{tower},$$

$$APN(\mathbb{R}_{p_i,t_j})=APN \quad (4)$$

Other embodiments may conclude that the minimum latency measurement observed in the aggregated latency records 504 involving the cell site, APN 612, and signal strength specified in the request represents the inherent latency between the first computing device and the APN 612. In such embodiments, the latency between the first computing device and the APN 612 may be expressed as shown in Equation (5) below.

$$\text{latency}_{phone-APN}(RSSI,\text{tower},APN)=\text{minimum}_{i,j}(\text{latency}(\mathbb{R}_{p_i,t_j}))$$

$$\text{where } RSSI(\mathbb{R}_{p_i,t_j})=RSSI,$$

$$\text{tower}(\mathbb{R}_{p_i,t_j})=\text{tower},APN(\mathbb{R}_{p_i,t_j})=APN \quad (5)$$

The first latency value is then subtracted from the determined latency between the first computing device and the access point to obtain the second latency value. In some embodiments, a set of third latency values is maintained by a third-party service. In such embodiments, the estimator component 510 accesses the third-party service to retrieve the third latency value for the particular set of latency factor values from the received request. The third-party service may include, for example, a network coordinate system that builds virtual coordinates of Internet nodes or elements to predict latencies between the nodes.

Using the exemplary latency factors from Table 1, the latency between the APN 612 and the destination computing device 104 may be expressed as shown in Equation (6) below.

$$\text{latency}_{APN-destination}(APN(\mathbb{R}_{p_i,t_j}),\text{destination}(\mathbb{R}_{p_i,t_j}),t_j) \quad (6)$$

Some embodiments include the recommendation component 512. The recommendation component 512, when executed by the processor of the latency service 118 causes the processor to compare the latency estimation calculated by the estimator component 510 with a pre-defined threshold. Based on the comparison, the recommendation component 512 selects one or more alternative cell sites. For example, if the calculated latency estimation exceeds the pre-defined threshold, the recommendation component 512 selects the alternative cell sites having latencies that will reduce the calculated latency estimation to less than the pre-defined threshold. The selected, alternative cell sites are identified to the first computing device. The first computing device then may connect to one of the selected cell sites to experience reduced latency.

Figure 6:
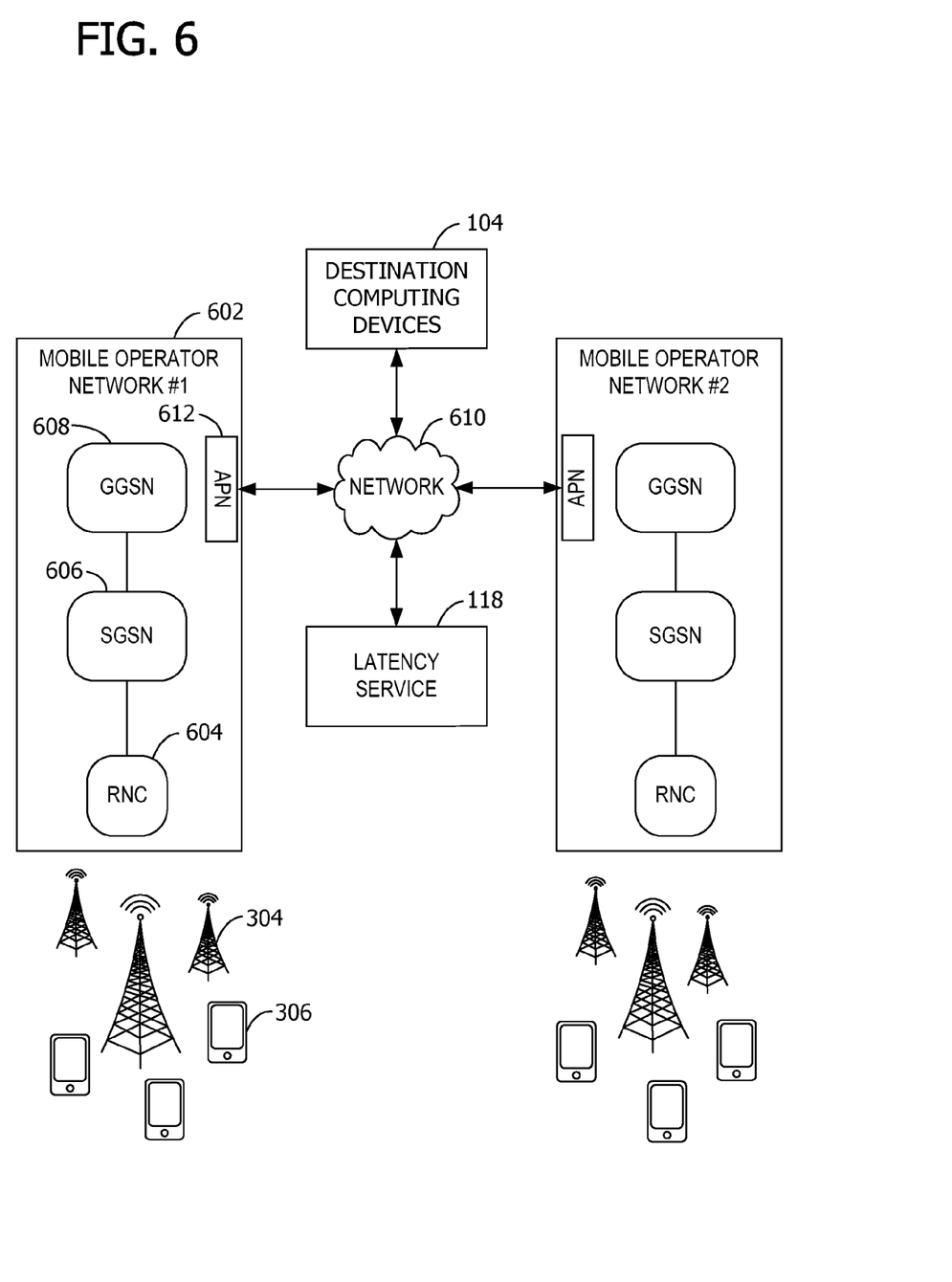
FIG. 6 is an exemplary block diagram illustrating network elements involved in communication between mobile computing devices and destination computing devices.

Referring next to FIG. 6, an exemplary block diagram illustrates network elements involved in communication between mobile computing devices 306 and destination computing devices 104. The mobile computing devices 306 connect to cell sites. The cell sites connect to mobile operator networks 602 such as mobile operator network #1 and mobile operator network #2. Exemplary mobile operator networks 602 include one or more radio network controllers 604 (RNC), serving general packet radio service (GPRS) support nodes 606 (SGSN), gateway GPRS support nodes 608 (GGSN), and APNs 612. Each mobile operator network 602 may have multiple APNs 612, where each APN 612 corresponds to a particular type of class of service.

The mobile operator networks 602 connect to the destination computing devices 104 via a network 610.

The first latency value, second latency value, and third latency value for each of the mobile computing devices 306 are dependent at least on the particular cell sites and mobile operator networks 602 to which each of the mobile computing devices 306 is connected.

Additional Examples

In some embodiments, the set of exemplary latency factors describing the context of a latency measurement includes additional or fewer factors. For example, the set of latency factors associated with one of the latency records 112 may include an Internet Protocol (IP) address or a mobile operator name associated with the computing device 102 performing the measurement, instead of including the APN 612. In such an example, the IP address acts as a replacement for the APN 612. The latency service 118 may be able to identify the APN 612 from the IP address and/or the mobile operator name.

While aspects of the disclosure have been described with reference to an APN such as APN 612, other embodiments are operable with other network configurations. In general, the APN is an access proxy representing the last point on the mobile operator network before traffic goes to the Internet. The access proxy is also the last point that is visible to the computing device 102 as part of the configuration of the computing device 102. Aspects of the disclosure are operable with any such access proxy.

At least a portion of the functionality of the various elements in FIG. 5 may be performed by other elements in FIG. 5, or an entity (e.g., processor, web service, server, application program, computing device, etc.) not shown in FIG. 5.

In some embodiments, the operations illustrated in FIG. 2 and FIG. 4 may be implemented as software instructions encoded on a computer-readable medium, in hardware programmed or designed to perform the operations, or both. For example, aspects of the disclosure may be implemented as a system on a chip.

While no personally identifiable information is tracked by aspects of the disclosure, embodiments may have been described with reference to data monitored and/or collected from users. In such embodiments, notice is provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for estimating the latency between the first computing device and the second computing device.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system comprising:
   a memory area associated with a mobile computing device, said memory area storing at least one latency record; and
   a processor programmed to:
      determine a latency of data transmitted from the mobile computing device to one of a plurality of destination computing devices;
      create the at least one latency record having latency factors identifying at least the determined latency and said one of the plurality of destination computing devices, wherein the at least one latency record is stored in the memory area;
      provide the at least one latency record stored in the memory area to a latency service, wherein the latency service analyzes the at least one latency record with respect to a plurality of latency records received from a plurality of computing devices, determines relationships between the latency factors and the determined latency, and provides a plurality of latency estimations, which are calculated based on the determined relationships, to requesting computing devices;
      compare the latency estimations with a pre-defined threshold;
      predict a time or location when a latency estimation to a current cell site exceeds the pre-defined threshold;
      based on the comparison and the predicted time or location, select an alternative cell site with a latency estimation that either:
         has a latency estimation less than the latency estimation for the current cell site at the predicted time or location; or
         does not exceed the pre-defined threshold at the predicted time or location; and
      adjust at least one operation performed by the mobile computing device based on the selected alternative cell site and the predicted time or location.

2. The system of claim 1, wherein the latency estimation comprises a first latency value corresponding to a latency between the mobile computing device and the selected alternative cell site, a second latency value corresponding to a latency between the selected alternative cell site and an access point, and a third latency value corresponding to a latency between the access point and the one of the plurality of destination computing devices.

3. The system of claim 2, wherein the first latency value is dependent on one or more of the following: a signal strength experienced by the mobile computing device, the selected alternative cell site, and a congestion of the selected alternative cell site.

4. The system of claim 2, wherein the second latency value is dependent on a mobile operator network associated with the access point and congestion of the mobile operator network.

5. The system of claim 2, wherein the latency service further determines congestion associated with the selected alternative cell site by analyzing a quantity of computing devices currently connected to the selected alternative cell site.

6. The system of claim 1, wherein the processor is further programmed to determine when to communicate with the one of the plurality of destination computing devices based on the latency estimation.

7. The system of claim 1, wherein the latency factors further identify one or more of the following: a cell site identifier, a signal strength, an access proxy, a location of the mobile computing device, a timestamp, and a mobile operator.

8. The system of claim 1, wherein the at least one latency record is provided based on one or more of the following: upon creation, periodically, and a threshold quantity of accumulated latency records.

9. The system of claim 1, wherein the processor is further programmed to switch to the alternative cell site at the at the predicted time or location.

10. A computer implemented method comprising:
    receiving a request for a latency estimation for sending data from a first computing device to a second computing device, the first computing device being connected to a first cell site, said request identifying latency factors of the first computing device including one or more of the following: a cell site identifier associated with a cell site, a signal strength, an access proxy, a time stamp, and a destination computing device;
    accessing the latency factors and latency measurements aggregated from a plurality of computing devices;
    defining relationships between the accessed latency factors and the accessed latency measurements;
    providing the calculated latency estimation to the first computing device;
    predicting a time or location when the calculated latency estimation exceeds a pre-defined threshold;
    based on the predicted time or location, determining, by the first computing device, to switch to a second cell site that either;
       has a latency estimation that is less than the calculated latency estimation for the first cell site at the predicted time or location; or
       has a latency estimation that does not exceed the pre-defined threshold at the predicted time or location;
    switching to the second cell site at the predicted time or location; and
    adjusting at least one operation performed by the first computing device based on switching to the second cell site at that the predicted time or location.

11. The method of claim 10, further comprising filtering the defined relationships to identify first latency values associated with cell sites near the first cell site.

12. The method of claim 10, further comprising calculating an accuracy value associated with the calculated latency estimation.

13. The method of claim 10, further comprising:
    selecting one or more alternative cell sites based on the defined relationships and the calculated latency estimation; and recommending, to the first computing device, connection by the first computing device to at least one of the selected alternative cell sites.

14. The method of claim 10, further comprising:
receiving a location of the first computing device; and
selecting one or more wireless fidelity access locations based on the received location, wherein connection by the first computing device to one of the selected wireless fidelity access locations yields a latency that is less than the calculated latency estimation.

15. The method of claim 10, further comprising aggregating latency records from the plurality of computing devices and filtering the aggregated latency records based on a cell site identifier or access proxy, and wherein calculating the latency estimation comprises calculating the latency estimation based on the filtered, aggregated latency records.

16. The method of claim 10, wherein the calculated latency estimation comprises a first latency value corresponding to a latency between the first computing device and the second cell site, a second latency value corresponding to a latency between the second cell site and an access point, and a third latency value corresponding to a latency between the access point and the second computing device.

17. One or more computer storage devices storing computer-executable components included in a latency service, said components comprising:
an interface component that when executed by at least one processor causes the at least one processor to receive a request for a first latency estimation for sending data from a first computing device to a second computing device using a first cell site, said request identifying latency factors of the first computing device;
a measurement filter component that when executed by at least one processor causes the at least one processor to access relationships derived from latency factors and latency measurements aggregated from a plurality of computing devices;
an estimator component that when executed by at least one processor causes the at least one processor to calculate the first latency estimation based on the relationships accessed by the measurement filter and the latency factors of the first computing device received by the interface component, and predict a time or location when the first latency estimation to the first cell site exceeds a pre-defined threshold, wherein the interface component provides the first latency estimation and the predicted time and location to the first computing device; and
a recommendation component that when executed by at least one processor causes the at least one processor to:
compare the first latency estimation at the predicted time or location with the pre-defined threshold, and
select an alternative cell site based on the comparison, the selected alternative cell site having a second latency estimation for sending data from the first computing device to the second computing device using the selected alternative cell site, wherein the second latency estimation is less than the first latency estimation at the predicted time or location, or does not exceed the pre-defined threshold at the predicted time or location.

18. The one or more computer storage devices of claim 17, wherein the estimator component calculates a first latency value and a second latency value, and further retrieves a third latency value from a data store.

19. The one or more computer storage devices of claim 17, wherein the recommendation component further calculates, based on movement of the first computing device and the relationships accessed by the measurement filter component, a time duration during which the first latency estimation calculated by the estimator component remains valid.

20. The one or more computer storage devices of claim 17, wherein the first latency estimation comprises a first latency value corresponding to a latency between the first computing device and the selected alternative cell site, a second latency value corresponding to a latency between the selected alternative cell site and an access point, and a third latency value corresponding to a latency between the access point and the second computing device.

* * * * *